United States Patent
Lee

(10) Patent No.: US 9,718,350 B2
(45) Date of Patent: Aug. 1, 2017

(54) STRUCTURE OF FUEL DOOR

(71) Applicant: Hyundai Motor Company, Seoul (KR)

(72) Inventor: Seong-Muk Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/940,733

(22) Filed: Nov. 13, 2015

(65) Prior Publication Data

US 2017/0057347 A1   Mar. 2, 2017

(30) Foreign Application Priority Data

Aug. 24, 2015  (KR) .................. 10-2015-0118892

(51) Int. Cl.
   *B60K 15/05*   (2006.01)
(52) U.S. Cl.
   CPC ........ *B60K 15/05* (2013.01); *B60K 2015/053* (2013.01); *B60K 2015/0576* (2013.01)
(58) Field of Classification Search
   CPC ...... B60K 2015/053; B60K 2015/0546; B60K 2015/0561; B60J 5/04; B60J 5/047; B60J 5/0473; B60J 5/0491; B60J 5/06; E05C 19/02; E05C 19/022; E05C 19/166
   USPC ........... 292/251.5, 144, 262, 272; 296/97.22, 296/136.01, 146.9, 155, 183.1, 207, 37.8
   See application file for complete search history.

(56) References Cited

U.S. PATENT DOCUMENTS

| | | | |
|---|---|---|---|
| 6,234,555 B1 * | 5/2001 | Emmerich ............. | B60K 15/04 220/86.2 |
| 8,382,187 B2 * | 2/2013 | Guendouz .......... | B60K 15/0406 141/348 |
| 8,720,968 B2 * | 5/2014 | Zalan ...................... | E05B 83/34 292/251.5 |
| 2008/0178962 A1 * | 7/2008 | Baudoux ................ | B60K 15/04 141/350 |
| 2013/0076059 A1 | 3/2013 | Zalan et al. | |

FOREIGN PATENT DOCUMENTS

| | | |
|---|---|---|
| JP | 06-328955 | 11/1994 |
| JP | 2008-044455 A | 2/2008 |
| JP | 2009-537397 A | 10/2009 |
| KR | 10-2004-0042837 A | 5/2004 |
| KR | 10-2006-0064844 A | 6/2005 |
| KR | 10-2006-0043759 | 5/2006 |

* cited by examiner

*Primary Examiner* — Glenn Dayoan
*Assistant Examiner* — Sunsurraye Westbrook
(74) *Attorney, Agent, or Firm* — Mintz Levin Cohn Ferris Glovsky & Popeo, P.C.; Peter F. Corless

(57) ABSTRACT

A structure of a fuel door is provided. The fuel door includes a sector-shaped gear that uses a rotating shaft in conjunction with a hinge of fuel door, a first spring having a first end coupled to a housing and a second end coupled to the gear. The first spring applies an elastic force and rotates the gear in a direction that opens the fuel door. A latch is rotatably coupled to the housing by a hinge component having one end of the latch parallel to the rotating shaft of the gear. The latch has a first surface in contact with an exterior circumferential surface of the gear to restrict rotation of the gear and a second spring having a first end coupled to the housing, and a second end in contact with a second surface of the latch, the second spring translates the latch toward the gear.

8 Claims, 8 Drawing Sheets

STRUCTURE OF FUEL DOOR

CROSS-REFERENCE TO RELATED APPLICATIONS

This application claims priority to Korean Patent Application No. 10-2015-0118892, filed on Aug. 24, 2015, which is incorporated herein by reference in its entirety.

BACKGROUND

Field of the Invention

The present disclosure relates to a structure of a fuel door and, more particularly, to a structure of a fuel door which produced at reduced cost, with a reduced weight.

Description of Related Art

FIG. 1 is an exemplary view illustrating problems of a conventional technique according to the related art. FIG. 2 is an exemplary enlarged sectional view of portion B of FIG. 1 according to the related art. Referring to FIGS. 1 and 2, a housing provided with a fuel inlet, through which fuel is supplied into a vehicle, is disposed in a rear portion of a side exterior panel of the vehicle. A fuel filler door (hereinafter, referred to as a fuel door) is that opens and closes is coupled (e.g., mounted) to the housing.

Typically, the fuel door is locked by a fuel door opener. In response to an operating signal from a user (e.g., a key fob), the fuel door is released from the fuel door opener and is opened by the elastic force of an elastic member. The fuel door opener is classified into a mechanical operation type having the opener connected to an operating button provided around a driver seat by a cable or the like. When the cable is pulled by a pulling operation of the operating button by a driver, and an electronic operation type in which the opener is configured to be operated by a solenoid, a motor or the like in response to an electrical signal to release the door by the operation of a switch proximate to a driver However, in the conventional technique, operational problems may frequently occur. For example, the opener may be restricted by an opener bracket due to a problem of the opener being at an incorrect position, or due to damage to a rod of the opener. The above information disclosed in this section is merely for enhancement of understanding of the background of the invention and therefore it may contain information that does not form the prior art that is already known in this country to a person of ordinary skill in the art.

SUMMARY

The present invention provides a structure of a fuel door absent an opener that lock/unlocks the fuel door in the conventional technique, and is integrally disposed in a housing.

In one aspect an exemplary embodiment of the present invention, a structure of a fuel door may include a sector-shaped gear (100) that uses a rotating shaft in conjunction with a hinge of a fuel door (2), a first spring (200) having a first end coupled to a housing (1), and a second end coupled to the gear (100). The first spring (200) may apply an elastic force to the gear (100) to rotate the gear (100) in a direction that opens the fuel door (2). A latch (300) may be rotatably coupled to the housing (1) by a hinge component (310) having a one end of the latch (300) parallel to the rotating shaft of the gear (100), the latch (300) having a first surface may contact an exterior circumferential surface of the gear (100) to prevent the gear (100) from rotating. A second spring (400) may include a first end coupled to the housing (1), and a second end in contact with a second surface of the latch (300), the second spring (400) may translate (e.g., push) the latch (300) toward the gear (100).

The gear (100) may include a plurality of gear teeth (110) formed along the exterior circumferential surface of the gear (100). For example, each of the gear teeth (110) may have a ramp surface inclined toward the latch (300). The gear (100) may include a gear lever (120) that protrudes in a radial direction. The gear lever (120) may extend a preset length from the exterior circumferential surface of the gear (100). The latch (300) may include latch teeth (320) formed along the first surface of the latch (300) in contact with the gear (100). The latch teeth (320) may engage with the gear teeth (110), and each of the latch teeth (320) may have a ramp surface inclined toward the gear (100).

The hinge component (310) may include a guide component (330) formed on an upper surface of the hinge component (310) to have a stepped structure with respect to a vertical direction, the guide component (330) may contact a distal end of the gear lever (120). The stepped structure of the guide component (330) may be formed by a preset (e.g., predetermined) height difference. The structure may further include a gear damper (500) that engages the gear teeth (110) and may be configured to adjust a speed at which the fuel door (2).

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
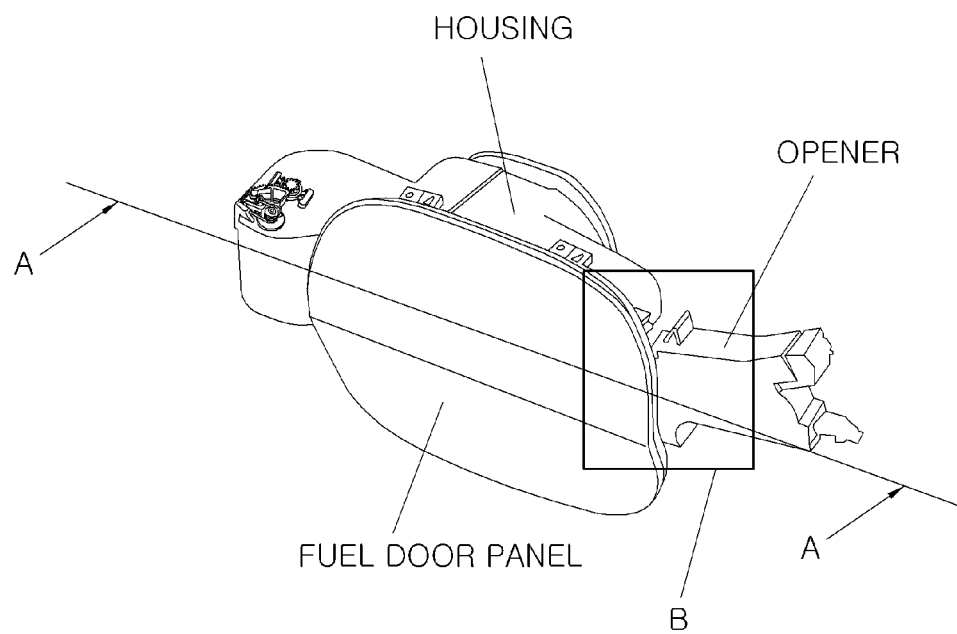
FIG. 1 is an exemplary view for explaining problems of a conventional technique according to the related art.
Figure 2:
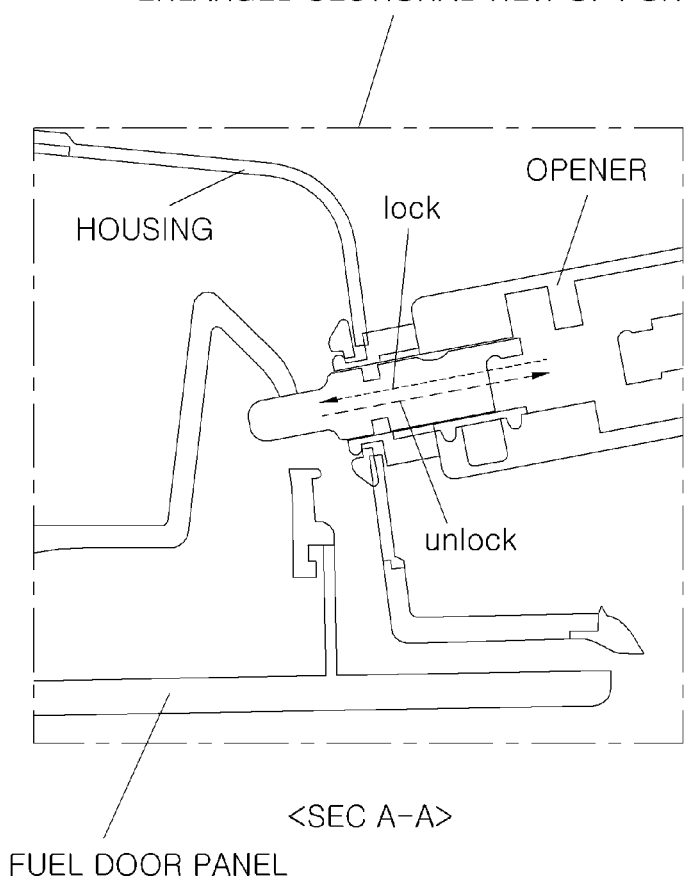
FIG. 2 is an exemplary enlarged sectional view of portion B of FIG. 1 according to a conventional technique according to the related art.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Hereafter, the present invention will be described so that those skilled in the art to which the present invention pertains can easily carry out the invention. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 3:
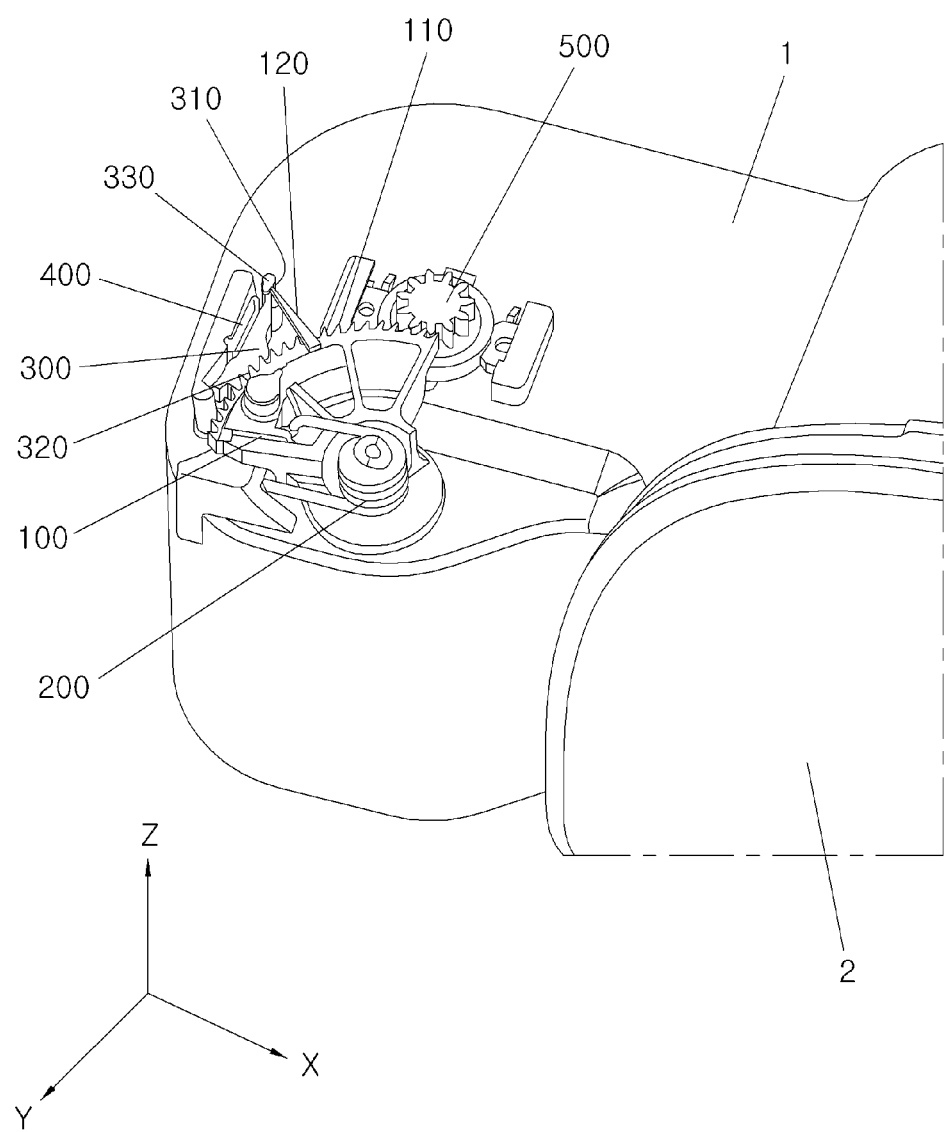
FIG. 3 is an exemplary perspective view of a fuel door according to an exemplary embodiment of the present invention.

FIG. 3 is an exemplary perspective view of a fuel door according to an exemplary embodiment of the present invention. Referring to FIG. 3, the fuel door according to an exemplary embodiment of the present invention may include a gear 100, a first spring 200, a latch 300, a second spring 400 and a gear damper 500. The gear 100 may use a rotating shaft in conjunction with a hinge of the fuel door 2 and may have a sector shape. The gear 100 may include a plurality of gear teeth 110 that may be formed along an exterior circumferential surface thereof. The gear teeth 110 may each have a ramp surface inclined toward the latch 300.

Furthermore, the gear 100 may include a gear lever 120 that protrudes in a radial direction. The gear lever 120 may extend a preset (e.g., predetermined) length from the exterior circumferential surface of the gear 100. The preset length of the gear lever 120 may include an appropriate length that allows the gear 100 to be removed from the latch 300 to open the fuel door 2. The preset length of the gear lever 120 may be adjusted based on the elastic forces of the first spring 200 and the second spring 400 or the like. For example, when the elastic force of the first spring 200 is greater than that of the second spring 400, the preset length of the gear lever 120 may be reduced. When the elastic force of the first spring 200 is less than that of the second spring 400, the preset length of the gear lever 120 may be increased.

A first end of the first spring 200 may be coupled (e.g., fixed) to a housing 1, and a second end thereof may be connected to the gear 100 to apply an elastic force to the gear 100 to rotate the gear 100 in a direction that may open the fuel door 2. Although the first spring 200 may be a coil spring, the present invention is not limited thereto. For example, the first spring 200 may be replaced with another type of element as the element may apply an elastic force to the gear 100 in the above-mentioned manner.

The latch 300 may be rotatably coupled to the housing 1 by a hinge component 310 having one end of the latch 300 parallel to the rotating shaft of the gear 100. A first surface of the latch 300 may be in contact with the exterior circumferential surface of the gear 100. The and thus functions may prevent the rotation of the gear 100. The latch 300 may include latch teeth 320 that may be formed along the first surface of the latch 300 that may contact the gear 100. The latch teeth 320 may engage the gear teeth 110 and may each have a ramp surface inclined toward the gear 100. The hinge component 310 may include a guide component 330 that may be formed on an upper surface of the hinge component 310 to form a stepped structure with respect to the vertical direction, and may contact a distal end of the gear lever 120. The stepped structure of the guide component 330 may be formed by a preset height difference.

The second spring 400 may include a first end coupled to the housing 1 and a second end in contact with a second surface of the latch 300. Accordingly, the second spring 400 may translate (e.g., push) the latch 300 toward the gear 100. Although the second spring 400 may be a plate spring, the present invention is not limited thereto. For example, the second spring 400 may be replaced with another type of element provided the element may perform the above-mentioned function. The gear damper 500 may engage the gear teeth 110 and may be configured to adjust the speed at which the fuel door 2 opens. Although the gear damper 500 may be an oil damper, the present invention is not limited thereto. For example, the gear damper 500 may be replaced with another type of element provided the element may perform the above-mentioned function.

Figure 4:
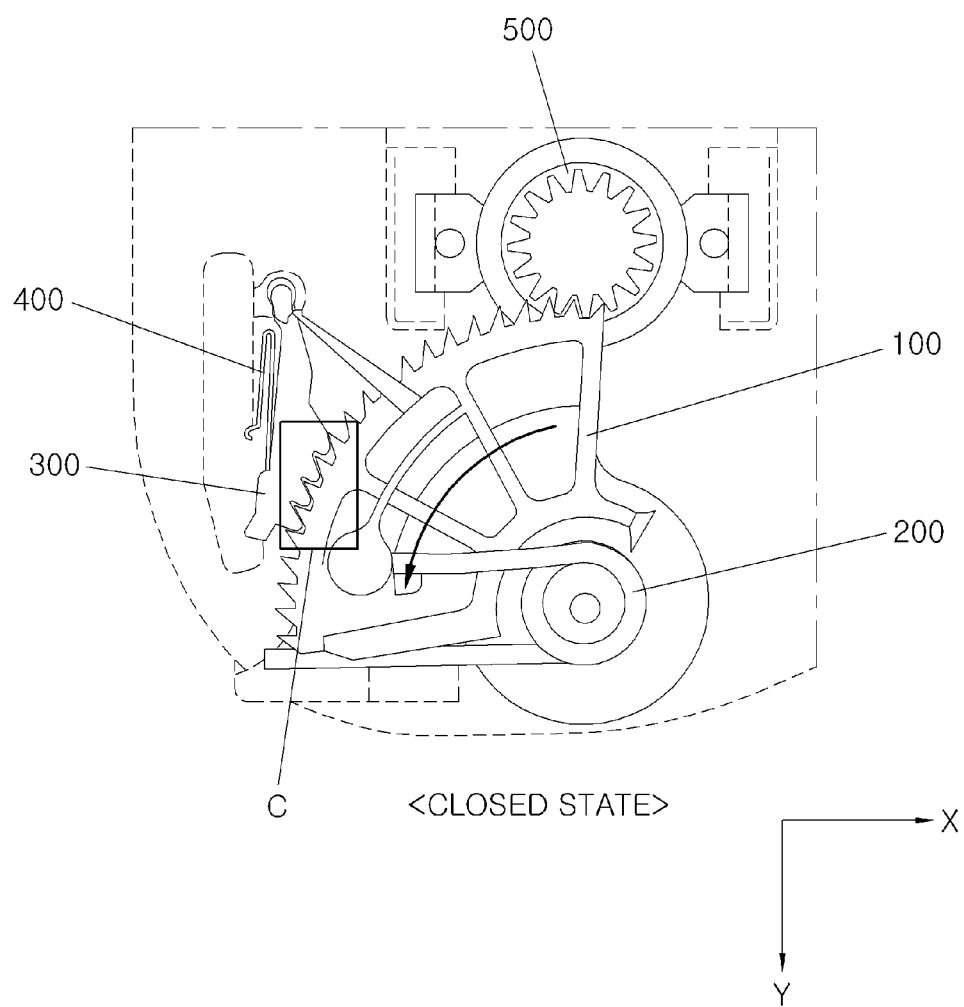
FIG. 4 is an exemplary view illustrating the operation of the fuel door in a closed position, according to an exemplary embodiment of the present invention.
Figure 5:
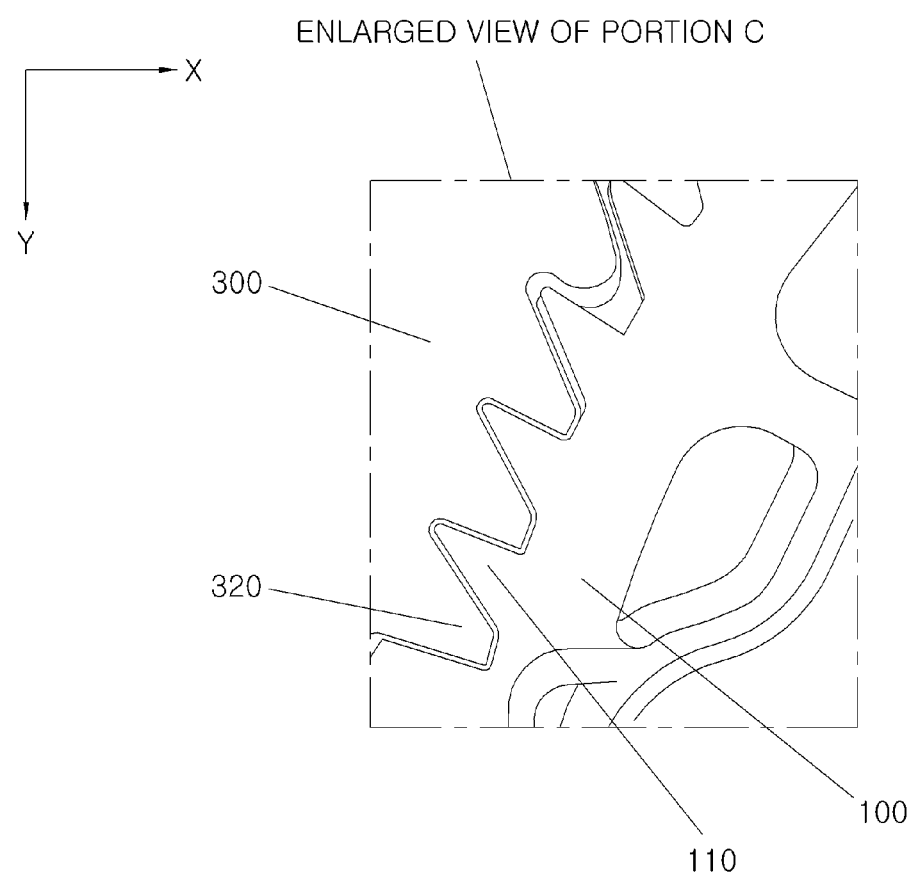
FIG. 5 is an exemplary enlarged view of portion C of FIG. 4 according to an exemplary embodiment of the present invention.

FIG. 4 is an exemplary view illustrating the operation of the fuel door in a closed position. FIG. 5 is an exemplary enlarged view of portion C of FIG. 4. As shown in FIGS. 4 and 5, an external force may be applied to the fuel door 2 in a direction at which fuel door 2 is closed. For example, the gear 100 that uses the rotating shaft in conjunction with the hinge of the fuel door may rotate in the direction to dispose the fuel door 2 in a closed position. In particular, the first spring 200 may be disposed between the gear 100 and the housing 1 and may be compressed. The latch 300 positioned adjacent to the gear 100 may be rotated around the hinge component 310 in a direction opposite to the direction that the gear 100 rotates. For example, the latch 300 may be continuously and elastically biased in the direction that contact the gear 100, since the second spring 400 supports the latch 300.

The external force may be removed after the fuel door 2 has been completely (e.g., securely) closed. In other words, the distal end of the gear lever 120 may be in contact with the guide component 330. In particular, a stepped portion of the guide component 330 may be positioned adjacent to the center of the hinge component 310. Furthermore, the gear teeth 110 and the latch teeth 320 may be disposed in an engaged position. For example, the frictional force with respect to the reverse direction may increase due to of the directionality in which the gear teeth 110 and the latch teeth 320 may be formed. Therefore, the gear 100 may be fixed in place by engagement with the latch 300, whereby the fuel door 2 may be disposed and maintained in the closed position.

Figure 6:
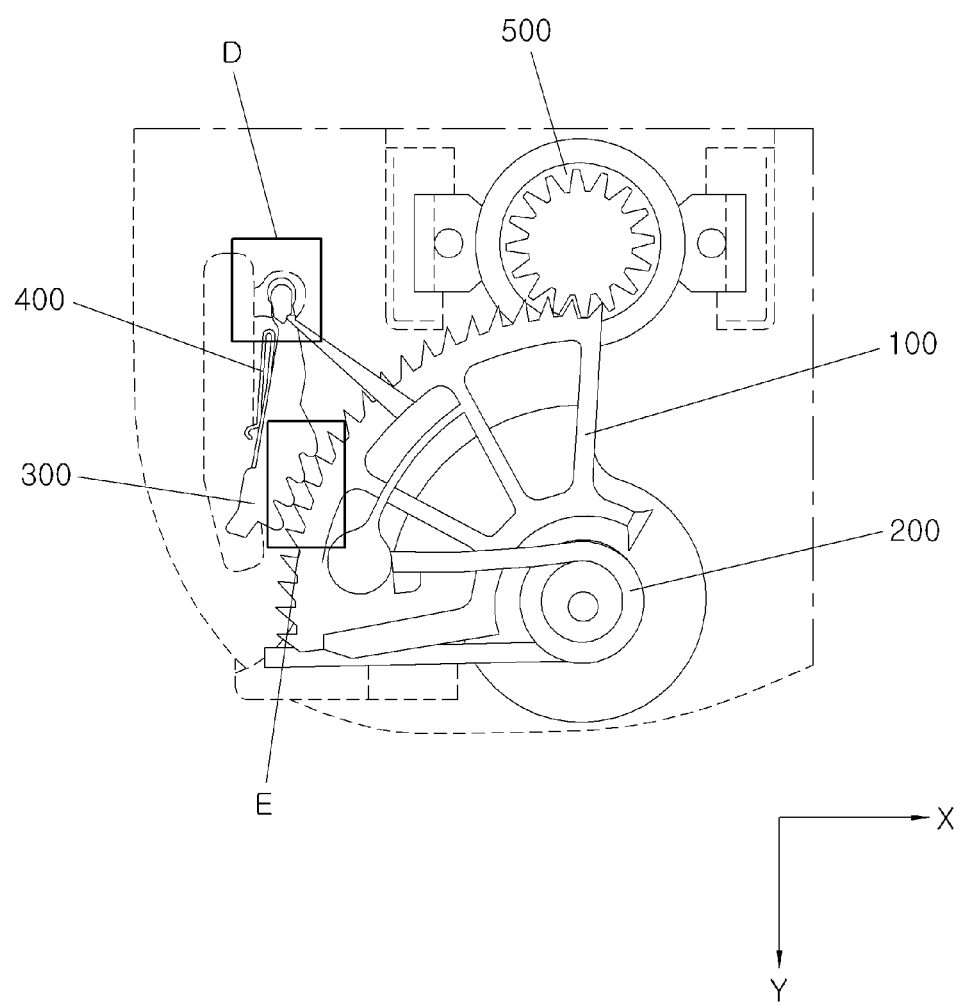
FIG. 6 is an exemplary perspective view illustrating the operation of the fuel door in an open position, according to an exemplary embodiment of the present invention.
Figure 7:
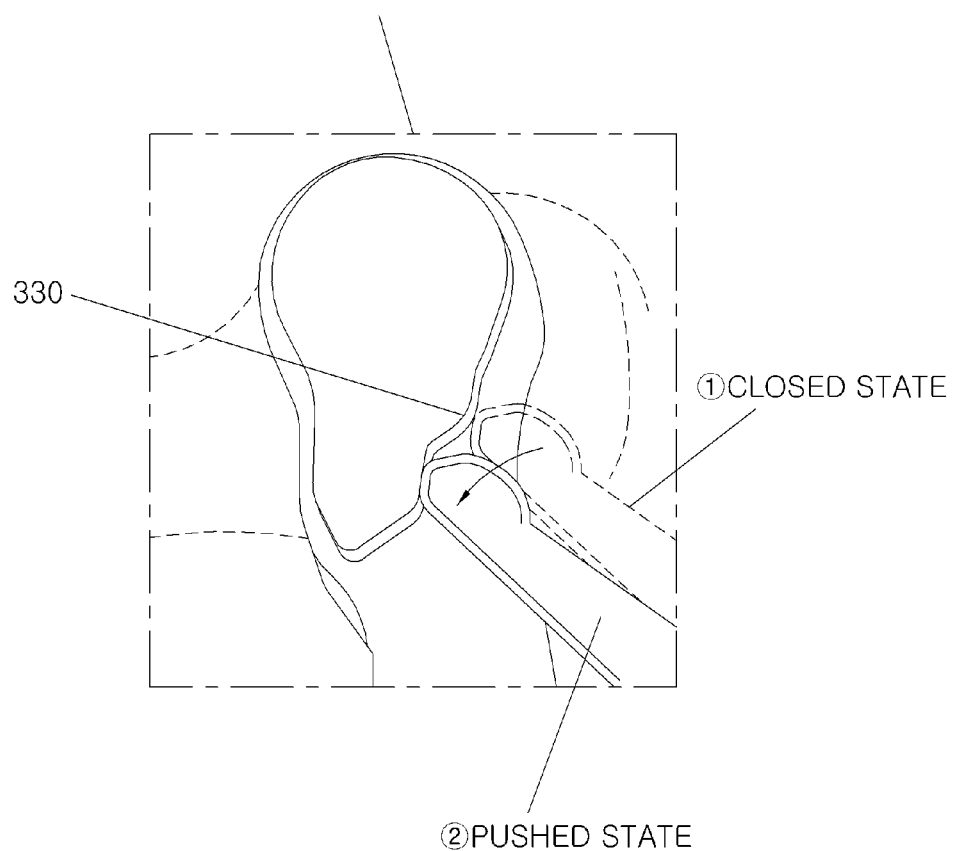
FIG. 7 is an exemplar enlarged view of portion D of FIG. 6 according to an exemplary embodiment of the present invention.
Figure 8:
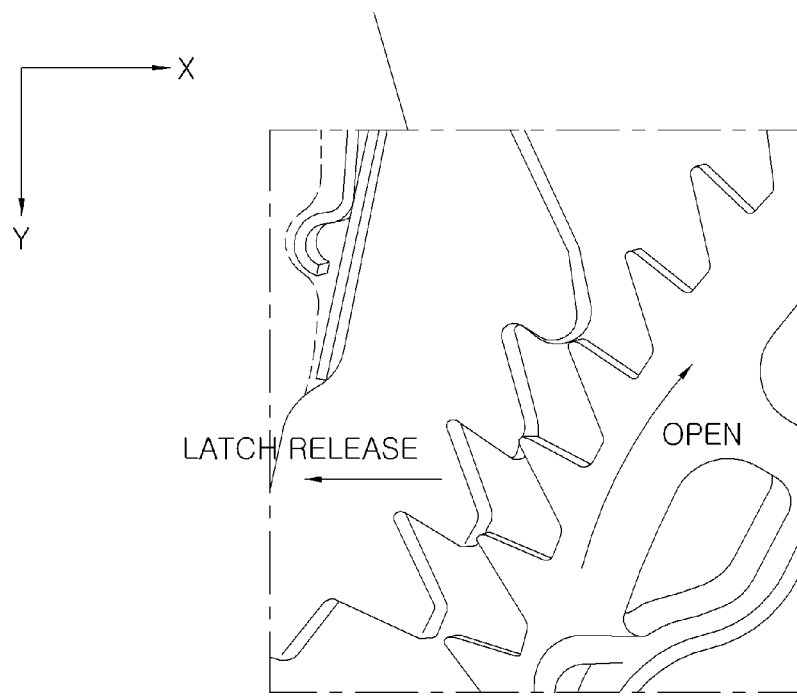
FIG. 8 is an exemplary enlarged view of portion E of FIG. 6 according to an exemplary embodiment of the present invention.

FIG. 6 is an exemplary perspective view illustrating the operation of the fuel door in an open position, according to an exemplary embodiment of the present invention. FIG. 7 is an exemplary enlarged view of portion D of FIG. 6. FIG. 8 is an exemplary enlarged view of portion E of FIG. 6. As shown in FIGS. 6 and 8, external force may be applied to the fuel door 2 in the direction in which the fuel door 2 is in a closed position. In other words, the magnitude of the external force required to dispose the fuel door 2 in an open position may be greater than that of the external force required to dispose the fuel door in a closed position. Further, the gear 100 may be rotated by the external force in the direction to dispose the fuel door 2 in a closed position. The distal end of the gear lever 120 may contact the guide component 330. In particular, a stepped portion of the hinge component 310 may be distant from the center of the hinge component 310. Thereby, the latch 300 may be further rotated, and the gear 100 may no longer contact the latch 300, whereby the gear teeth 110 may be disengaged from the latch teeth 320.

Subsequently, when the external force is removed, the gear 100 may be rotated by the elastic force of the first spring 200 in the direction to dispose the fuel door 2 in an open position. The gear damper 500 may adjust the rotating speed of the gear 100 to prevent the speed at which the fuel door 2 opens from being excessively high. For example, to prevent the gear 100 from being stopped by the latch 300 before the fuel door 2 is fully disposed in an open position, the elastic forces of the first spring 200 and the second spring 400 may be adjusted. As described above, according to an exemplary embodiment of the present invention, a fuel door may be embodied without use of a separate opener, unlike the conventional fuel door. Thereby, the production cost and weight of the fuel door may be reduced. The structure of the fuel door may be simplified. Additionally, a smooth opening and closing movement of the fuel door may be ensured.

Although exemplary embodiments of the present invention have been disclosed, they are merely examples of the present invention to allow one having ordinary skill in the art (hereinafter, refereed to as a 'skilled person') to implement the present invention. Therefore, the bounds of the present invention are not limited to the exemplary embodiments. Although the present invention have been described in detail, the scope of the present invention is not limited thereto but various modifications and improvements made by those skilled in the art using the basic concept of the present invention defined in the claims also fall within the scope of the present invention.

What is claimed is:

1. A structure of a fuel door, comprising:
 a sector-shaped gear that uses a rotating shaft in conjunction with a hinge of a fuel door;
 a first spring having a first end coupled to a housing, and a second end coupled to the gear, the first spring applies an elastic force to the gear to rotate the gear in a direction that opens the fuel door;
 a latch rotatably coupled to the housing by a hinge component having a first end of the latch parallel to the rotating shaft of the gear, the latch having a first surface in contact with an exterior circumferential surface of the gear to prevent the gear from rotating; and
 a second spring having a first end coupled to the housing, and a second end in contact with a second surface of the latch, wherein the second spring translates the latch toward the gear,
 wherein the gear comprises a gear lever protruding in a radial direction, and
 wherein the hinge component comprises a guide part formed on an upper surface of the hinge component to have a stepped structure with respect to a vertical direction, the guide part being brought contact into a distal end of the gear lever.

2. The structure of claim 1, wherein the gear includes a plurality of gear teeth formed along the exterior circumferential surface of the gear.

3. The structure of claim 2, wherein the gear teeth each have a ramp surface inclined toward the latch.

4. The structure of claim 3, wherein the latch includes latch teeth formed along the first surface of the latch in contact with the gear.

5. The structure of claim 4, wherein the latch teeth engage with the gear teeth and each have a ramp surface inclined toward the gear.

6. The structure of claim 1, wherein the gear lever extends a preset length from the exterior circumferential surface of the gear.

7. The structure of claim 1, wherein the stepped structure of the guide component is formed by a preset height difference.

8. The structure of claim 2, further comprising: a gear damper that engages the gear teeth and adjusts a speed that the fuel door opens.

* * * * *